United States Patent [19]

Dresler

[11] 3,890,997
[45] June 24, 1975

[54] AUTOMATIC PRESSURE-CONTROL VALVE, ESPECIALLY FOR A PRESSURIZED-GAS SUPPLY INSTALLATION

[75] Inventor: Helmut Dresler, Trostberg, Germany

[73] Assignee: Linde Aktiengesellschaft, Wiesbaden, Germany

[22] Filed: Mar. 2, 1973

[21] Appl. No.: 337,764

[30] Foreign Application Priority Data
Mar. 3, 1972 Germany............................ 2210362

[52] U.S. Cl............................. 137/271; 137/505.18
[51] Int. Cl............................................ F16k 51/00
[58] Field of Search .......... 137/271, 494, 495, 270, 137/492.5, 268, 269, 493, 505.18, 540; 251/361, 368; 62/55

[56] References Cited
UNITED STATES PATENTS
2,590,622  3/1952  Huber....................... 137/505.18 X
3,071,344  1/1963  Banks............................. 251/361 X
3,561,468  2/1971  Sugden, Jr. ..................... 137/270 X FOREIGN PATENTS OR APPLICATIONS
1,016,741  1/1966  United Kingdom................. 137/269

Primary Examiner—Martin P. Schwadron
Assistant Examiner—Robert J. Miller
Attorney, Agent, or Firm—Karl F. Ross; Herbert Dubno

[57] ABSTRACT

An automatically operable pressure-control valve, especially for a pressurized-gas supply installation, can be assembled to operate as a pressure-relief valve or a release-blocking valve by reason of the construction of the spring loaded valve member. The latter has a doubly-conical configuration and is engageable with an annular spring seat by one of the conical surfaces or the other, the spring seat being clamped between two housing portions of the valve.

5 Claims, 6 Drawing Figures

AUTOMATIC PRESSURE-CONTROL VALVE, ESPECIALLY FOR A PRESSURIZED-GAS SUPPLY INSTALLATION

FIELD OF THE INVENTION

The present invention relates to a pressure-control valve and, more particularly, to a versatile valve structure of a special utility in pressurized-gas supply installations.

BACKGROUND OF THE INVENTION

Automatically operated pressure-control valves are known which have a variety of configurations and are generally comprised of spring-loaded valve members biased against a valve seat formed unitarily in the housing, the spring pressure being adjustable to vary the pressure threshold of the valve. If the valve member is in a normally closed position, it may act as a pressure-relief valve, connecting one conduit or a vent to the supply conduit when the pressure in the latter exceeds a value above the threshold. Of course, pressure-control valves may also be used to block communication between two conduits in the absence of a certain minimum pressure or to close off a conduit when a pressure exceeds a predetermined level.

It has been proposed to use pressure-regulating valves of this general type in an installation for supplying gas under pressure to a consumer. Such installation may include a liquefied-gas tank, insulated against heat exchange with the environment, and gasification or evaporator means connected to this tank for converting the liquefied gas to the vapor under pressure. Systems of this type have been used for the storage, transport and delivery of liquefied natural gas and methane, in which the pressurized gas is intended to constitute a fuel, or for substantially any gas which may remain liquid at ambient pressure by an appropriate insulation of the vessel and/or cooling thereof.

The pressure-regulating valve is provided for control of the pressure in such systems, and such pressure-regulating valves, generally of numerous parts, are so specialized that a valve suitable for one purpose cannot be utilized for another, or are of complex and expensive construction.

A typical installation of the type described above, e.g. for the delivery of pressurized gas to a consumer, may include a pressure-relief valve in which excess gas pressure is vented into a duct to prevent explosion, a low-pressure regulating valve designed to block upon reduction of pressure at a port of the valve, or a high-pressure control valve designed to block in the event the pressure at one of the valve ports exceeds a predetermind level. In all of these conventional systems specialized valves were required for each purpose at high cost.

OBJECTS OF THE INVENTION

The principal object of the present invention is to provide a pressure-control or pressure-regulating valve whereby the aforementioned disadvantages are obviated.

Another object of this invention is to provide a pressure-regulating valve or a pressure-responsive valve, particularly for use with a pressurized-gas supply system, whereby the valve has standardized parts which can be used interchangeably for any and all of the control purposes previously described.

Still another object of this invention is to provide a multiple-function pressure-responsible valve of simple construction, low cost and adaptable merely by simple differences in an assembly, for use in blocking at an increase in pressure or decrease in pressure selectively.

Still another object of this invention is to provide a versatile pressure-responsive valve with a minimum of parts, considerable simplicity of assembly and effective construction to eliminate the manifold disadvantages of earlier systems.

It is also an object of this invention to provide an improved gas-supply system in which the pressure-responsive valves are multi-functional or can be composed of similar parts so as to be functionally interchangeable with a minimum of assembly alterations.

SUMMARY OF THE INVENTION

These objects and others which will become apparent hereinafter are obtained in accordance with the present invention, in a pressure-responsive valve which comprises an elongated housing defining a value chamber and composed of two threadedly interconnected housing members each of which forms one of the ports of the valve and between which a seating ring may be clamped by a pair of shoulders of the threadedly interconnected housing portions.

The valve member, according to the invention, is of the poppet type and has a doubly-conical valve head with one of the frustoconical valve portions or cones of the head being engageable with the seating ring upon axial displacement of the valve member in one direction. The rings, or a ring, is so constructed and arranged as to be receivable against either of two axially-spaced shoulders of the housing whereby either of the frustoconical surfaces of the valve member may be rendered effective.

According to an important feature of the present invention, the ports extend at right angles to one another and, in axial alignment with one of the ports, one of the housing members being formed with a cylindrical casing receiving a spring bearing axially upon the poppet-valve body in one direction, preferably via a self-centering arrangement such as a ball engaged by a spring seat of the prestressed compression spring received in this casing.

Depending upon whether the seating ring is disposed aheat of the frustoconical valve member in the direction in which the latter is biased by the compression spring or whether its seating ring is disposed behind the frustoconical head with respect to this bias direction, the valve may have either of two opposite functions. The valve may act as a pressure-buildup controller or as a pressure-drop controller and, of course, as a pressure-relief or safety valve opening upon the generating of excess pressure at one of the ports.

It has been found to be particularly advantageous to provide a spacer sleeve of cylindrical configuration in one of the housing parts and adapted to bear axially against the seating ring and to retain the latter against a shoulder of one of the housing parts when the two housing parts are threadedly interconnected, thereby holding the seating ring in place. Furthermore, the seating ring is preferably composed of a deformable synthetic resin material such as polytetrafluoroethylene and may, in one position of the ring, be clamped between juxtaposed faces of the two housing parts so as to act as a sealing ring between them.

According to another feature of the invention, the pressure-control valve forms part of a pressurized-gas delivery installation comprising an insulating tank containing liquid gas at low temperature, an evaporator converting the liquid into the vapor, and an automatic pressure-control system for the pressure buildup and pressure reduction. According to this aspect of the invention, one of the valves described previously as embodying the invention, is employed as a pressure-buildup controller and as an over-pressure relief valve and is connected in the line from the evaporator to the gas space of the tank from which the liquefied gas is fed to the evaporator via a syphon tube of the tank. The system also may include a low-pressure controller in the line from the gas space of the tank to the consumer line so that the pressure-drop controller functions also as a pressure relief valve.

The advantages of such a system is that the same basic valve structure may be used for functionally different valves, thereby reducing the number of parts which must be stocked for valve repair, increasing the versatility of the fluid networks since changeover in valve functions can be effected simply by altering the position of the valve seat, and simplifying the valve structures so that breakdown is less frequent.

DESCRIPTION OF THE DRAWING

The above and other objects, features and advantages of the present invention will become more readily apparent from the following description, reference being made to the accompanying drawing in which.

SPECIFIC DESCRIPTION

Figures 1, 1B, 1C:
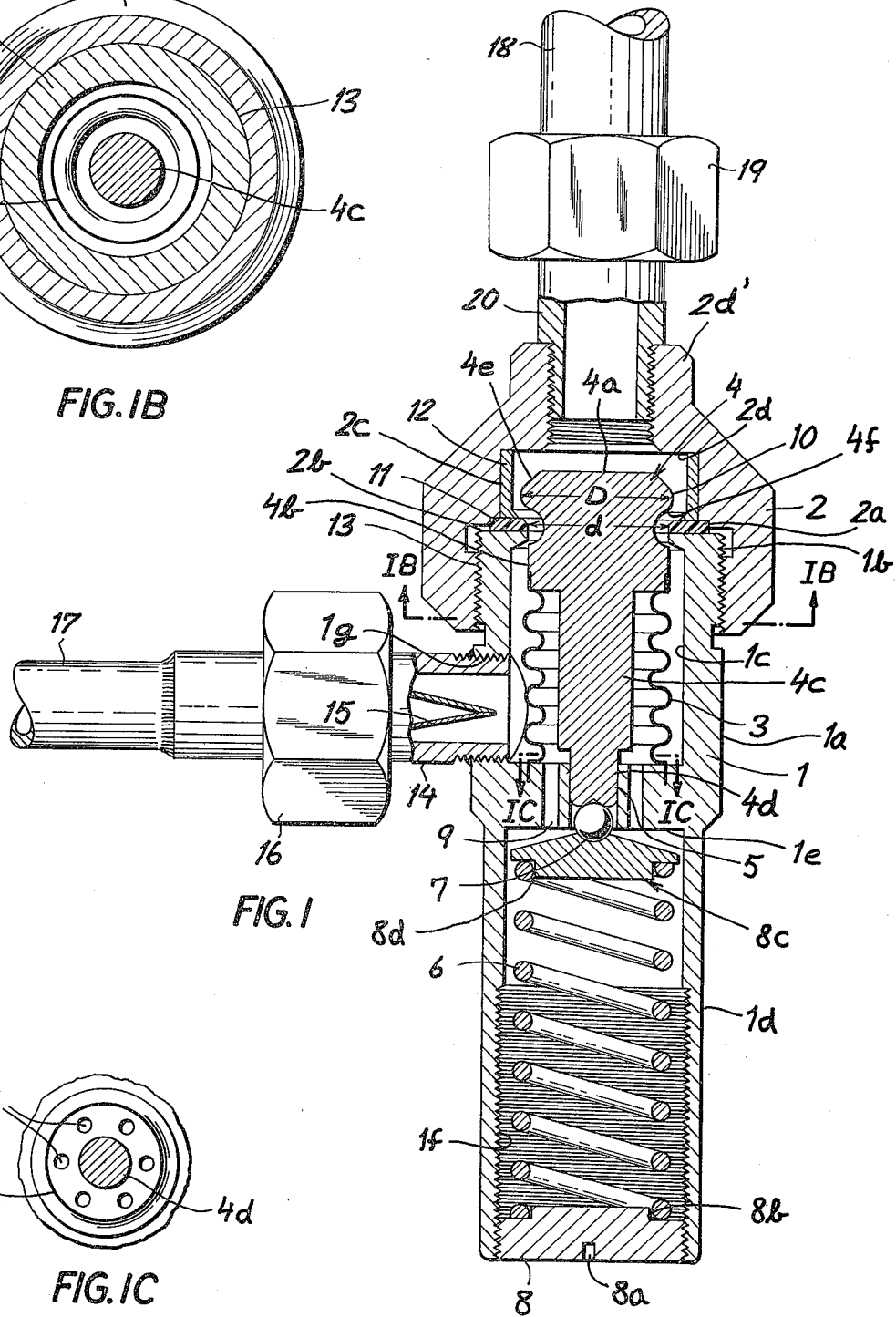
FIG. 1 is an axial cross-sectional view through a valve system embodying the invention.
FIG. 1B is a cross-section taken along the line IB — IB of FIG. 1.
FIG. 1C is a cross-sectional view taken generally along the line IC — IC of FIG. 1.
Figure 2:
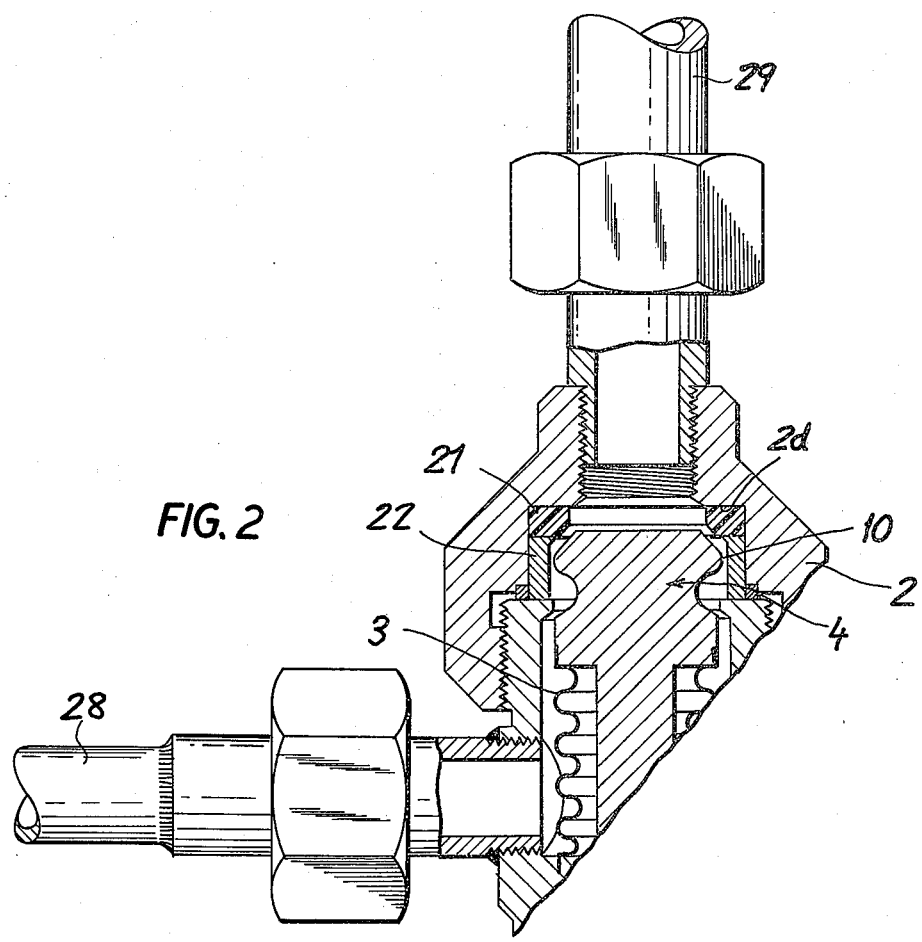
FIG. 2 is an axial cross-sectional view similar to FIG. 1 but showing the parts thereof in another orientation.
Figure 1A:
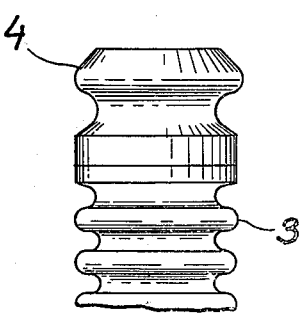
FIG. 1A is an elevational view of a portion of the valve member thereof.

In FIGS. 1 and 2 the same reference numerals are used to identify identically functioning parts and parts which are of identical configuration and structure.

The valves of FIGS. 1 and 2 comprise a pair of cylindrical housing portions 1 and 2 which are threadedly interconnected in the axial direction by mating threads shown diagrammatically at 13. The housing 1 may, to this end, have a cylindrical body 1a, threaded portion 1b at one axial end of the housing, a female threaded casing 1d at the opposite axial end of the casing, a chamber 1c at the firstmentioned end and a partition 1e separating casing 1d from axial chamber 1c.

The internal thread 1f of the casing 1b receives a threaded disk 8 having a slot engageable by a screwdriver so that the degree to which the disk 8 is advanced into the casing 1d or withdrawn therefrom can be readily readjusted. The disk 8 has a cylindrical step 8b in the form of a boss about which the final turn of a coil compression spring 6 is disposed, the spring 6 being seated under compression against the disk 8.

At its opposite end, the spring 6 bears upon another spring seat 8c and is disposed about a cylindrical boss 8d thereof, the disk 8c having a ball 7 axially shiftable in a bore 5 and resting against a face of the shank of a poppet or valve member 4. In other words, the spring 6 biases valve member 4 upwardly. The partition 1e is provided with throughgoing bores 9 connecting a chamber around the valve member to the casing 1d and eventually to the atmosphere through a leakage path provided between the threaded disk 8 and the thread 1f. The pattern of bores 9 is surrounded by a bellows 3 anchored at one end to the partition 1e and at the other end to the head 4a of the valve member.

The valve member comprises the doubly-conical head 4a which is mounted upon a shoulder 4b carried by a shank 4c and terminating in a cylindrical stub 4d, the latter bearing upon the ball 7. The head 4a is constructed so that it defines two frustoconical sealing surfaces or cones 4e and 4f of which only the latter is used in the valve shown in FIG. 1. This valve comprises a ring 11 of polytetrafluoroethylene having an upwardly beveled inner surface and clamped between a shoulder 2a and the front face 2b of the housing parts 2 and 1, respectively. A spacer sleeve 12 of cylindrical configuration, snugly fits into the bore 2c and is urged at the shoulder 2d axially against the ring 11, applying it axially to the face 2b. The ring has an internal diamater $d$ which is, of course, less than the external diameter $D$ of the doubly-conical head 4a at the junction between the broad bases of the sealing frustocones.

Housing part 2, here formed as a nut, has a cylindrical internally threaded boss $2d'$ into which a fitting 20 is threaded, the latter forming part of a union 19, coupling the valve to a duct or conduit 18.

The housing portion 1 is provided with a threaded port 1g into which a nipple 14 is threaded, the latter being provided with a particle-removing screen or filter 15 and forming part of a union 16 connecting the valve to conduit 17.

As will be apparent from FIGS. 1 and 2, the precompression of spring 6 may be controlled by threading the disk 8 to a greater or lesser extent into the casing 1d. The bellows-type seal is fixed to the head 4a of the valve member 4 by soldering at its external periphery and has its interior space connected by the vent bores 9 with the casing compartment receiving the spring and therefore with the atmosphere. The valve head 4a is provided with doubly conical sealing surfaces 10, either of which can engage a respective sealing ring.

In the embodiment shown in FIG. 1, the seating ring 11 is disposed below the double cone 10, is composed of polytetrafluoroethylene, is clamped between parts 1 and 2 of the housing under compression and seals the junction between them so that no fluid can escape along the screw thread 13, and provides a sealing engagement with the head 4a of the member 4 when the pressure differential between conduit 18 and conduit 17 exceeds the threshold defined by the precompression of spring 6 and the atmospheric pressure at line 9. The spacer sleeve 12 further retains the seating ring 11 in place.

The conduit 17 is here constituted as a supply line while the conduit 18 is connected as a discharge line, the valve being held open by the force of spring 6. Only when a predetermined threshold pressure differential on opposite sides of the seat 11 is developed, favoring axial displacement of the valve member 4 downwardly, is the force of spring 6 overcome sufficiently to drive the valve member against the spring force and the pneumatic pressure into engagement with the valve seat 4. The fluid flow between conduit 17 and conduit 18 is terminated and no further pressure buildup in line 18 can occur. When the pressure in line 18 drops further, the force of spring 6 rises above the force contribution of the pressure differential so that the valve is again opened. To prevent trapping of cold gas ahead of the controller, the seating surface of the valve content in the closed position is greater than the pneumatically effective area of the bellows. When the pressure in line 17 increases in a closed condition of the valve (as a result of trapping of cold gas), the valve body is lifted and the excess pressure relieved into duct 18. The valve of FIG. 1 thus functions as a pressure-buildup controller as well as an excess-pressure and, therefore, safety valve.

In FIG. 2 there is shown an identical valve structure in which the parts have not only the same functions as those of FIG. 1 but also the same dimensions so as to be interchangeable therewith. Only the position of the seating ring 21 and the spacer sleeve 22 distinguishes the valve by being located on the opposite side of the double cone 10. In this arrangement, the polytetrafluoroethylene ring 21 lies ahead of the double cone 10 and has an internal diameter smaller than the diameter D. The sleeve 22 clamps the seat 21 against the shoulder 2d of the housing part 2. The sleeve 22 is, of course, engaged by the face 2b of housing part 1.

The valve of FIG. 2 is a pressure-drop controller or low-pressure regulator since the spring 6 normally holds the valve closed. When the pressure rises in the tank, for example as a result of autogenous evaporation, the pneumatic force may overcome the threshold established by spring 6 and open the valve. Line 29, which may be connected with the gas space in the tank, now communicates with line 28, communicating with the consumer line until the gas pressure in the tank drops and permits the valve to close. Since the sealing surface of the valve cone 10, in a closed position, is here substantially identical to the pneumatically effective bellows surface, the valve operates as a pressure-relief valve when the pressure in line 29, upon trapping of cold gas, rises. In this case, the operation of the valve is independent of the pressure in line 29. This eliminates the need for a separate safety valve.

Figure 3:
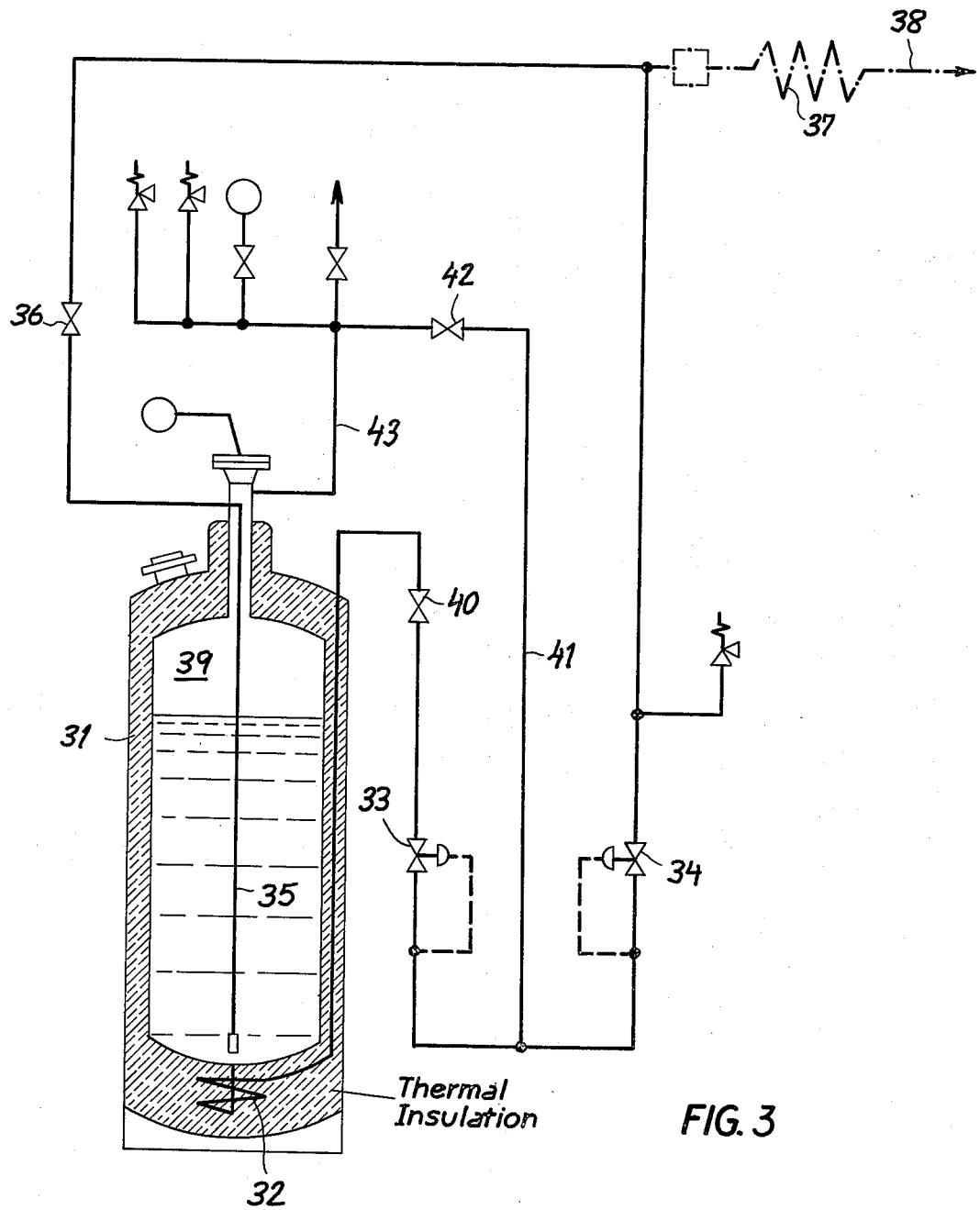
FIG. 3 is a vertical sectional view through a supply tank or a pressurized gas distribution system according to the invention, the conduits and valves being illustrated diagrammatically.

In FIG. 3, I show a gas-supply installation which comprises a thermally insulated tank 31 containing a low-temperature liquefied gas, and an evaporator 32 for vaporizing the liquefied gas, and an automatic control system for the upper and lower pressure limits in the form of a pressure-buildup controller 33 (FIG. 1) and a pressure-drop controller 34 (FIG. 2) whereby the control valve 33 also functions as a pressure-relief valve.

A syphon tube 35 extends into the liquefied gas within the tank 31 and serves as a liquefied-gas withdrawal conduit which leads through a cutoff valve 36 (serving as a filling and discharge valve) to a gasifier or evaporator 37 which communicates in turn with a consumer line 38. To discharge liquefied gas from tank 31, it is necessary to provide a displacement pressure in the gas space 39 above the liquid level in the tank. Liquid is drawn from the bottom of the tank into the evaporator 32 and converted to gas at increased pressure, the gas being led through a cutoff valve 40 and past the pressure-buildup control valve 33 (which in this case is open) into line 41 and via another cutoff valve 42 into line 43 communicating with the gas space of the tank.

The pressure in the gas space 39 is thereby increased.

As long as this pressure-buildup continues, the pressure differential in valve 33 is sufficiently large to maintain this valve in an open condition. When, however, gas withdrawal terminates, the pressure differential across valve 33 drops so that the valve closes. When the pressure in gas chamber 39 rises, e.g. as a result of autoevaporation, the valve 34 opens and the gas is discharged by ducts 43 and 41 to the consumer line 38. When the pressure is again reduced to the desired level, valve 34 closes and liquefied gas is delivered via line 35 to the evaporator 37.

I claim:

1. A pressure-control comprising:
   a valve body having two housing parts connected together and defining an elongated valve chamber, said body being formed with at least two longitudinally spaced-apart ports communicating with said chamber;
   a poppet-type valve member linearly displaceable in said chamber longitudinally thereof and having a doubly-conical valve head defining a pair of oppositely converging sealing surfaces;
   a seating ring of deformable polytetrafluorethylene clamped in said body between said housing parts and engageable with a selected one of said sealing surfaces upon displacement of said valve member and positioned interchangeably with a seating ring engageable with the other valve surface thereof;
   a spring received in said body and acting upon said valve member to bias the latter in one linear direction against a fluid-pressure differential applied to said head, said valve forming a pressure-buildup controller upon insertion of one of said rings into said body and a pressure-drop controller upon introduction of the other of said rings into said body; and
   a spacer sleeve in said body and bearing axially upon said ring, said sleeve being axially engaged by one of said housing parts and urging said ring annularly against the other housing part;
   one of said housing parts including a casing receiving said spring, a disk threaded into said casing and forming a seat for said spring, a partition in said one of said parts separating said casing from said chamber and formed with a throughgoing bore slidably receiving an end of said valve member remote from said head, at least one vent passage formed in said partition and communication between the interior of said casing and a space around said valve member, and an axially extensible and contractable bellows anchored at one end to said head and at the other end to said partition and enclosing said vent passage.

2. The valve defined in claim 1 wherein the other housing part is axially threaded onto said one housing part at the opposite end of said other housing part and includes a transverse annular shoulder, said ring being seated against said shoulder.

3. The valve defined in claim 2, further comprising a centering ball received in said bore and bearing axially on said valve member, said casing being provided with a further seat engaging said spring at an end thereof opposite said disk and bearing upon said ball, said one of said parts being formed with a generally radial tubular fitting communicating with said chamber, said one of said parts being provided with a generally axial fitting opening in the direction of displacement of said valve member.

4. The valve defined in claim 3 wherein the cross-sectional area of said valve member exposed to the pressure in said fitting opening axially at said other housing part is substantially equal to the cross-sectional area of the valve member enclosed by said bellows.

5. The valve defined in claim 3 wherein the cross-sectional area of said valve member exposed to fluid pressure in said chamber upon engagement of said head with said ring is greater than the cross-sectional area of said valve member enclosed by said bellows.

* * * * *